United States Patent [19]

Kawai et al.

[11] 4,017,322
[45] Apr. 12, 1977

[54] METHOD FOR REINFORCING AQUEOUS HYDRAULIC CEMENT

[75] Inventors: Motochika Kawai, Fujisawa; Izuru Shimozawa, Odawara, both of Japan

[73] Assignee: Japan Inorganic Material Co., Ltd., Kanagawa, Japan

[22] Filed: June 9, 1975

[21] Appl. No.: 584,830

Related U.S. Application Data

[63] Continuation of Ser. No. 459,218, April 8, 1974, abandoned.

[30] Foreign Application Priority Data

Nov. 20, 1973 Japan .......................... 48-130545
Nov. 20, 1973 Japan .......................... 48-130546
Nov. 20, 1973 Japan .......................... 48-130547
Nov. 20, 1973 Japan .......................... 48-130548
Nov. 20, 1973 Japan .......................... 48-130549
Dec. 21, 1973 Japan .......................... 48-143117
Dec. 21, 1973 Japan .......................... 48-143118
Dec. 27, 1973 Japan ............................. 49-1919
Dec. 29, 1973 Japan ............................. 49-4088
Mar. 18, 1974 Japan ............................ 49-30823

[52] U.S. Cl. .................................. 106/99; 427/401; 427/430 B
[51] Int. Cl.² ................. C04B 31/44; C04B 31/06; B05D 1/18
[58] Field of Search ............ 106/99; 428/378, 389; 427/401, 430 B, 399; 65/3 R, 30 E

[56] References Cited

UNITED STATES PATENTS

| 2,793,130 | 5/1957 | Shannon | 106/99 |
| 3,416,953 | 12/1968 | Gutzeit | 428/389 |
| 3,887,386 | 6/1975 | Majumdar | 106/99 |

FOREIGN PATENTS OR APPLICATIONS 73-61,800   8/1973   Japan

OTHER PUBLICATIONS

Chemical Abstracts, 80:16355g, 1974.

*Primary Examiner*—James R. Hoffman
*Attorney, Agent, or Firm*—Toren, McGeady and Stanger

[57] ABSTRACT

Aqueous solutions containing phosphoric acid, phosphate, or a salt of titanium, zirconium or hafnium are useful for forming coatings on the glass fiber surfaces. Such coatings may be formed by immersing the glass fiber in the solution at elevated temperatures. The coating enhances the alkali corrosion resisting properties of the glass fiber, so that the glass fibers surface-treated therewith are particularly useful as reinforcement in aqueous hydraulic cement mixtures for imparting to the curved products made therefrom, physical strength which is stable with elapse of time.

9 Claims, No Drawings

METHOD FOR REINFORCING AQUEOUS HYDRAULIC CEMENT

CROSS REFERENCE TO RELATED APPLICATION

This is a continuation of application Ser. No. 459,218, filed Apr. 8, 1974, now abandoned.

BACKGROUND OF THE INVENTION

1. Field of the Invention

This invention relates to a procedure for surface-treating glass fibers to coat them with phosphoric acid, phosphate, or hydrous metal oxides to enhance and improve cement-alkali corrosion resisting properties of the glass fibers and to a method for reinforcing cement structure.

2. Description of the Prior Art

In the past, considerable effort has been devoted to glass fibers for use with aqueous hydraulic cement mixtures, such as, concrete, mortar and plaster containing Portland cement, lime, water glass and the like in order to enhance the physical strength of the cured products made from these materials. Such a cured concrete, mortar or plaster is known to be more durable with elapse of time when the glass fibers incorporated therein as reinforcements have more resistance to corrosion from alkaline substances, such as, calcium hydroxide, magnesium hydroxide, potassium hydroxide and sodium hydroxide, and the like. These alkaline substances are prominent in aqueous hydraulic cement mixtures, and, therefore, will be herinafter referred to an all inclusive term as "cement alkali". Particularly, in the case of Portland cement, some of the calcium hydroxide remains in the form of a dispersed aqueous solution in the matrix of the cured Portland cement for a considerably long length of time even after the aqueous hydraulic cement mixture has been cured completely. For this reason, during such a length of time, the dispersed aqueous calcium hydroxide solution continues to corrode the surfaces of the glass fibers incorporated in the cured product and decrease the ultimate physical strength of the products.

As far as the glass material itself is concerned, it has heretofore been found that zirconia ($ZrO_2$) is an effective ingredient for improving such a cement alkali corrosion resisting property of glass. Therefore, almost all glass materials which are so-called "cement-alkali resisting glass" contain zirconia without exception. Satisfactory improvements are generally effected with a zirconium content ranging from 4% to 10% on a weight basis. In the case of glass fibers, however, the increased surface area casues the susceptibility to corrosion with cement-alkali to increase, so that it is necessary to increase the content of zirconia to more than 10%, and, in extreme cases, as high as 20% to impart a sufficient alkali-corrosion resisting property thereto. On the other hand, increasing the zirconia content not only renders the resulting glass compositions unsuitable for the melting operation, but also increases the frequency of end breakages of fibers in the spinning operation because of increased liquidus temperatures of the glass compositions. In the manufacture of glass fibers, therefore, it is almost impossible to employ such glass compositions containing more than 10% by weight of zirconia for the purpose of economically spinning glass fibers from the melt thereof.

SUMMARY OF THE INVENTION

Accordingly, it is an object of the present invention to provide a novel method of enhancing and improving the alkali corrosion resisting property of glass fibers without the necessity of complicated procedures.

Another object is to provide aqueous treating solutions which are adapted for coating glass fibers.

Another object is to provide glass fibers which have been provided with an adherent phosphoric acid, phosphate, or hydrous metal oxide coating which is effective to inhibit the alkali-corrosion of the glass fibers.

Still another object is to provide glass fibers for adding to concrete, mortar and like cementitious mixtures which impart to the cured products made therefrom a physical strength stabilized against alkali corrosion.

These and other objects of the invention are achieved by using reinforcing glass fibers which have been treated with an aqueous treating solution containing phosphate ion, titanium ion, zirconium ion and/or hafnium ion.

DESCRIPTION OF THE PREFERRED EMBODIMENT

As examples of the aqueous treating solutions preferably useable in the present invention, mention may be made of phosphoric acid solutions, metaphosphoric acid solutions pyrophosphoric acid solutions, sodium phosphate solutions, potassium phosphate solutions, titanium tetrachloride solutions, titanic sulfate solutions, zirconium tetrachloride solutions, zirconium nitrate solutions, zirconyl nitrate solutions, zirconium sulfate solutions, hafnium sulfate solution, hafnium tetrachloride solutions, mixed solutions of titanium salt solutions and hafnium salt solutions, mixed solutions of titanium slt solutions and zirconium salt solutions, and mixed solutions of zirconium salt solutions and hafnium salt solutions. The concentrations of phosphate ions, titanium ion, zirconium ion and hafnium ion are not particularly limited. Concentrations of less than 10% by weight are preferred. Beneficiating concentrations are in the order of about 1% by weight.

In accordance with the present invention, glass fibers made from soda lime glass compositions and glass fibers made from glass compositions containing zirconia in a relatively small amount are treated with aqueous treating solutions by various methods. A preferred method is to immerse the glass fibers in the aqueous treating solution. The treating temperature and time are dependent upon the concentration of the aqueous treating solution. the treatment at a temperature of 80°–95° C for about 2 hours is preferred. As the treatment temperature is decreased by 10° C, the treating time is increased by about 100% to effect an equivalent result.

Specific examples of the aqueous treating solutions of the invention are shown hereinbelow.

SOLUTIONS A, B and C

As typical examples of water soluble zirconium salts useable in the invention, mention may be made of zirconium tetrachloride, zirconium oxynitrate dihydride and zirconium sulfate tetrahydride. These salts are capable of hydrolyzing in aqueous solutions at elevated temperatures to precipitate the desired insoluble hydrous oxides or mixtures of such oxides onto the immersed glass fiber. Using these salts, aqueous treating solutions A, B and C are prepared, solutions A1 and A2 containing 3% and 5% by weight of ZrCl₄ and having pH values of 0.71 at 15° C and 0.49 at 15.5° C, respectively; solutions B1 and B2 containing 3% and 5% by weight of ZrO(NO₃)₂ and having pH values of 1.22 at 195° C and 1.03 at 13° C, respectively; and solutions C1 and C2 containing 3% and 5% by weight of Zr(SO₄)₂ and having pH values of 0.95 at 14° C and 0.75 at 15.55° C, respectively.

SOLUTIONS D and E

Aqueous treating solutions D1, D2 and D3 containing 1.0%, 3.0% and 5.0% by weight of titanium tetrachloride (TiCl₄) and having pH values of 1.04, 0.69 and 0.38 at 15° C, respectively; and aqueous treating solutions E1, E2 and E3 containing 1.0%, 3.0% and 5.0% by weight of titanic sulfate Ti(SO₄)₂ and having pH values of 1.12, 0.89 and 0.39 at 15° C, respectively.

SOLUTION F

Aqueous treating solutions F1, F2 and F3 containing 0.15%, 0.5% and 3.0% by weight of hafnium tetrachloride HfCl₄ and having pH values of 2.17, 1.70 and 0.88 at 15° C, respectively.

SOLUTION G

Aqueous treating solutions G1 through G5 containing mixtures of zirconium tetrachloride and hafnium tetrachloride in the following weight percent corcentrations and having the following pH values

|         | G1   | G2   | G3   | G4   | G5   |
|---------|------|------|------|------|------|
| ZrCl₄   | 2.0  | 1.5  | 1.0  | 0.5  | 0    |
| HfCl₄   | 0    | 0.5  | 1.0  | 1.5  | 2.0  |
| pH(15° C) | 0.81 | 0.83 | 0.90 | 0.93 | 0.92 |

SOLUTION H

Aqueous treating solutions H1 through H5 containing mixtures of titanium tetrachloride and zirconium tetrachloride in the following weight percent concentrations having the following pH values.

|         | H1   | H2   | H3   | H4   | H5   |
|---------|------|------|------|------|------|
| TiCl₄   | 0    | 0.5  | 1.0  | 1.5  | 2.0  |
| ZrCl₄   | 2.0  | 1.5  | 1.0  | 0.5  | 0    |
| pH(15° C) | 0.71 | 0.73 | 0.68 | 0.60 | 0.50 |

SOLUTION I

Aqueous treating solutions I1 through I5 containing mixtures of titanium tetrachloride and hafnium tetrachloride in the following weight percent concentrations and having the following pH values

|         | I1   | I2   | I3   | I4   | I5   |
|---------|------|------|------|------|------|
| TiCl₄   | 0    | 0.5  | 1.0  | 1.5  | 2.0  |
| HfCl₄   | 2.0  | 1.5  | 1.0  | 0.5  | 0    |
| pH(15° C) | 0.75 | 0.68 | 0.65 | 0.61 | 0.57 |

SOLUTION J

Aqueous treating solutions J1 through J7 containing 0.1%, 0.5%, 1.0%, 3.0% 5.0%, 7.0% and 10% by weight of phosphoric acid and having pH values of 2.31, 1.79, 1.62, 1.41, 1.29, 0.99 and 0.87 at a temperature of 15° C.

The following examples are submitted to illustrate the utility and the property of the coatings deposited by the above-mentioned aqueous treating solutions of the invention.

EXAMPLE 1

A number of soda-lime glass fiber specimens, each specimen consisting of a bundle of twenty glass fibers of 50cm long were immersed in the aqueous treating solutions A, B and C individually in a vertical position at a depth of about 10cm under the level of solution with heating to 80° C for 2 hours. After that, the treated fibers were well washed with water and dried in air to obtain fibers having a zirconium oxide coating deposited thereon.

The ability of the zirconium oxide coating deposited by the solutions A, B and C of this invention to resist corrosion is shown by the results of the following cement alkali corrosion test. In this test, a cement alkali solution having a pH value of from 12 to 14 was prepared in such a manner that a suspension of 1.0Kg of Portland cement in 3.5 liters of water is allowed to stand for 24 hours and then the supernatant fluid was filtrated. The coated portions of the glass fibers were immersed again in the cement alkali solution in a vertical position at a depth of about 10cm under the level of solution in a stainless steel beaker heated in a boiling water for 2.5 hours. Each of the twenty glass fibers were cut off in a length of 10cm from the opposite ends to obtain two tensile test segments, one of which had not been treated with the aqueous solution of the invention as well as the cement alkali solution, and the other of which had been surface-treated with the aqueous solution of the invention and then treated with the cement alkali solution. Using these forty test segments per specimen for each aqueous treating solution, the load W in grams required to break the fiber segment and the diameter D in millimeters of the fiber at the break point were measured and recorded in the following Table I. The Table I also gives the tensile strength E in Kg/mm² which is defined by the following equation:

$$E = \frac{4W}{\pi D^2 \cdot 10^{-3}}$$

The cement-alkali corrosion resistance improvement F may be estimated by the following formula $$F = \frac{C - B}{B}$$

(wherein B represents the tensile strength of the untreated fiber and C represents the tensile strength of the treated fiber.)

The results of the cement-alkali corrosion test, summarized in Table I, indicate that the aqueous zirconium salt solutions A, B and C of the invention enhance the alkali corrosion resisting property of soda-lime glass fibers.

Table I.

| Soln. | Final pH | Load(g) Blank | Load(g) Treated | Tensile strength (kg/mm²) Blank | Tensile strength (kg/mm²) Treated | Fiber diameter (μ) Blank | Fiber diameter (μ) Treated | Load gain (%) | Treatment temp. (° C) |
|---|---|---|---|---|---|---|---|---|---|
| A1 | 0.44 (18° C) | 25.88 | 35.89 | 81.40 | 109.63 | 20.23 | 20.43 | 38.7 | 79.8 |
| A2 | 0.29 (17.5° C) | 24.51 | 34.52 | 69.62 | 97.06 | 21.21 | 21.40 | 40.8 | 79.8 |
| B1 | 0.95 (13.2° C) | 28.36 | 37.76 | 78.56 | 101.52 | 21.71 | 21.64 | 33.1 | 81.8 |
| B2 | 0.77 (13.0° C) | 23.86 | 36.01 | 64.72 | 98.24 | 21.64 | 21.53 | 50.9 | 81.8 |
| C1 | 0.88 (13.0° C) | 26.85 | 33.12 | 76.69 | 96.42 | 20.98 | 20.82 | 23.4 | 79.8 |
| C2 | 0.71 (13.8° C) | 26.49 | 26.96 | 71.25 | 73.56 | 21.77 | 21.67 | 1.8 | 81.8 |

EXAMPLE II

Using an aqueous titanium chloride solution D1, two soda-lime glass fiber specimens prepared by cutting a bundle of twenty glass fibers having diameters ranging from 14 microns to 26 microns and a length of 100cm into two equal length parts were surface-treated at 90° C for 2 hours by being immersed in a vertical position at a depth of 10cm under the level of solution. The surface-treated glass fiber specimens were washed with water and dried in air. Each of the twenty glass fibers of one of the specimens was cut off in a length of 10cm from the opposite ends to obtain twenty surface-treated glass fiber segments and twenty untreated glass fiber segments. Using these segments, the tensile tests were carried out in the manner described with respect to Example I. Average values are given in Table IIa.

Next, the surface-treated portions of the twenty glass fibers of the other specimen were dipped in a vertical position at a depth of 10cm under the level of the cement-alkali solution of Example I heated to 90° C for 2.5 hours. Then the treated glass fibers were removed from the solution and washed with water. After being dried in a desiccator for 24 hours, each of the twenty glass fibers was cut off at a length of 10cm from the opposite ends to obtain two segments, one of which had been treated with the aqueous solution as well as the cement alkali solution, and another segment which had not been treated with both solutions. Using these segments, the tensile tests were carried out in the manner described with respect to Example I. Average values are given in Table IIb. The results of the surface treatment and cement-alkali corrosion test, summarized in Tables IIa and IIb indicate that a hydrous titanium oxide coating is effective to enhance the cement alkali corrosion resisting property of the glass fibers.

Using solutions D2, E1 and E2, the same surface treatment and cement alkali corrosion test as above were carried out. The results are summarized in Tables IIa and IIb.

Table IIa

| | | | Before Corrosion Test | | | | | |
|---|---|---|---|---|---|---|---|---|
| Soln. | Initial pH | Final pH | Load (g) Blank | Load (g) Treated | Tensile strength (Kg/mm²) Blank | Tensile strength (Kg/mm²) Treated | Fiber diameter (μ) Blank | Fiber diameter (μ) Treated |
| D1 | 1.04 | 1.41 | 22.85 | 24.19 | 63.78 | 67.85 | 21.19 | 21.23 |
| D2 | 0.69 | 0.69 | 20.52 | 21.09 | 68.70 | 70.22 | 19.68 | 19.87 |
| D3 | 0.38 | 0.39 | 25.96 | 32.03 | 81.09 | 100.18 | 20.14 | 20.10 |
| E1 | 1.12 | 1.10 | 19.20 | 22.68 | 59.31 | 75.09 | 19.82 | 19.54 |
| E2 | 0.89 | 0.80 | 19.78 | 25.34 | 61.24 | 72.44 | 20.53 | 20.59 |
| E3 | 0.39 | 0.39 | 27.28 | 28.08 | 84.22 | 88.53 | 20.31 | 20.13 |

Table IIb

| | After Corrosion Test | | | | | |
|---|---|---|---|---|---|---|
| Solution | Load (g) Blank | Load (g) Treated | Tensile strength (Kg/mm²) Blank | Tensile strength (Kg/mm²) Treated | Fiber diameter (μ) Blank | Fiber diameter (μ) Treated |
| D1 | 20.02 | 25.68 | 59.76 | 76.65 | 20.69 | 20.55 |
| D2 | 25.52 | 33.64 | 70.44 | 90.82 | 21.49 | 21.73 |
| D3 | 27.52 | 28.14 | 86.59 | 88.48 | 20.05 | 20.19 |
| E1 | 20.26 | 21.16 | 61.41 | 64.57 | 20.15 | 20.26 |
| E2 | 22.37 | 26.13 | 66.74 | 79.87 | 20.63 | 20.36 |
| E3 | 23.89 | 28.28 | 83.42 | 92.44 | 19.10 | 19.70 |

EXAMPLE III

Using a series of aqueous treating solutions F, soda-lime glass fibers were surface treated and subjected to the cement alkali corrosion test in the manner described with respect to Example II. The results, summarized in Table III, indicate that the hydrous hafnium oxide coatings deposited by the aqueous solutions F of this invention are effective to enhance the cement-alkali corrosion resisting property of soda-lime glass fibers treated therewith.

Table IIIa

| | | | Before Corrosion Test | | | | | |
|---|---|---|---|---|---|---|---|---|
| | Initial | Final | Load (g) | | Tensile strength (Kg/mm²) | | Fiber diameter (μ) | |
| Soln. | pH | pH | Blank | Treated | Blank | Treated | Blank | Treated |
| F1 | 2.17 | 1.84 | 26.91 | 31.69 | 66.17 | 76.73 | 22.83 | 23.06 |
| F2 | 1.79 | 1.60 | 18.48 | 20.60 | 61.15 | 68.43 | 19.69 | 19.59 |
| F3 | 0.88 | 0.71 | 30.15 | 39.52 | 85.04 | 110.30 | 21.26 | 21.36 |

Table IIIb

| | After Corrosion Test | | | | | |
|---|---|---|---|---|---|---|
| | Load (g) | | Tensile strength (Kg/mm²) | | Fiber diameter (μ) | |
| Solution | Blank | Treated | Blank | Treated | Blank | Treated |
| F1 | 21.57 | 26.13 | 61.37 | 77.50 | 21.16 | 20.74 |
| F2 | 22.59 | 25.49 | 66.64 | 74.99 | 20.61 | 20.71 |
| F3 | 28.77 | 31.38 | 92.46 | 98.08 | 19.88 | 20.11 |

EXAMPLE IV

Using a series of aqueous treating solutions F, glass fibers containing 8% by weight of zirconia were surface treated and subjected to the cement alkali corrosion test in the manner described with respect to Example II. The results, summarized in Table IV, indicate that the hydrous hafnium oxide coatings deposited by the aqueous solutions F of this invention are effective to enhance the cement-alkali corrosion resisting property of zirconia containing glass fibers treated therewith.

EXAMPLE V

Using two series of aqueous treating solutions D and E, zirconia containing glass fibers were surface treated and subjected to the cement alkali corrosion test in the manner described with respect to Example II. The results, summarized in Table V, indicate that the hydrous titanium oxide coatings desposited by the aqueous solutions D and E of this invention are effective to enhance the cement alkali corrosion resisting property of zirconia containing glass fibers treated therewith.

Table IVa

| | | | Before Corrosion Test | | | | | |
|---|---|---|---|---|---|---|---|---|
| | Initial | Final | Load (g) | | Tensile strength (Kg/mm²) | | Fiber diameter (μ) | |
| Soln. | pH | pH | Blank | Treated | Blank | Treated | Blank | Treated |
| F1 | 2.17 | 2.40 | 18.08 | 27.71 | 66.61 | 95.42 | 18.56 | 19.16 |
| F2 | 1.79 | 1.60 | 19.45 | 35.32 | 61.75 | 115.74 | 19.74 | 19.99 |
| F3 | 0.88 | 0.84 | 19.42 | 35.85 | 69.76 | 125.68 | 18.88 | 19.07 |

Table IVb

| | After Corrosion Test | | | | | |
|---|---|---|---|---|---|---|
| | Load (g) | | Tensile strength (Kg/mm²) | | Fiber diameter (μ) | |
| Solution | Blank | Treated | Blank | Treated | Blank | Treated |
| F1 | 18.67 | 28.34 | 67.36 | 98.96 | 18.77 | 18.98 |
| F2 | 21.03 | 37.42 | 69.96 | 128.46 | 19.25 | 19.64 |
| F3 | 23.12 | 26.57 | 72.63 | 81.48 | 19.99 | 20.22 |

Table Va

| | | | Before Corrosion Test | | | | | |
|---|---|---|---|---|---|---|---|---|
| | Initial | Final | Load (g) | | Tensile strength (Kg/mm²) | | Fiber diameter (μ) | |
| Soln. | pH | pH | Blank | Treated | Blank | Treated | Blank | Treated |
| D1 | 1.22 | 0.50 | 21.79 | 38.30 | 69.01 | 127.87 | 18.92 | 19.44 |
| D2 | 0.69 | 0.37 | 24.89 | 31.49 | 87.57 | 106.56 | 19.00 | 19.44 |
| D3 | 0.38 | 0.38 | 23.87 | 35.70 | 71.22 | 106.28 | 20.57 | 20.79 |
| E1 | 1.12 | 1.08 | 21.51 | 25.82 | 78.92 | 97.60 | 18.52 | 18.26 |
| E2 | 0.89 | 0.80 | 20.65 | 29.88 | 76.44 | 109.00 | 18.53 | 18.81 |
| E3 | 0.38 | 0.38 | 21.59 | 30.50 | 71.63 | 99.28 | 19.71 | 19.72 |

Table Vb

| | After Corrosion Test | | | | | |
|---|---|---|---|---|---|---|
| | Load (g) | | Tensile strength (Kg/mm²) | | Fiber diameter (µ) | |
| Solution | Blank | Treated | Blank | Treated | Blank | Treated |
| D1 | 19.77 | 28.58 | 74.35 | 107.45 | 18.51 | 18.61 |
| D2 | 19.36 | 25.26 | 67.79 | 88.03 | 19.06 | 19.10 |
| D3 | 25.37 | 35.09 | 80.19 | 112.14 | 19.97 | 20.04 |
| E1 | 18.47 | 23.49 | 68.60 | 82.14 | 18.45 | 18.67 |
| E2 | 24.14 | 25.36 | 81.63 | 118.64 | 19.37 | 19.61 |
| E3 | 26.64 | 30.05 | 84.57 | 95.87 | 19.97 | 20.02 |

EXAMPLE VI

Using a series of aqueous treating solutions G, soda-lime glass fibers were surface treated and subjected to the cement alkali corrosion test in the manner described with respect to Example II. The results, summarized in Table VI, indicate that the zirconium and hafnium oxide coatings deposited by the aqueous solutions G of this invention are effective to enhance the cement alkali corrosion resisting property of soda lime glass fibers treated therewith.

EXAMPLE VII

Using a series of aqueous treating solutions G, glass fibers containing 10% by weight of zirconia were surface treated and subjected to the cement alkali corrosion test in the manner described with respect to Example II. The results, summarized in Table VII, indicate that the hydrous zirconium and hafnium oxide coatings deposited by the aqueous solutions G of this invention are effective to enhance the cement alkali corrosion resisting property of zirconia containing glass fibers treated therewith.

Table VIa

| | | | Before Corrosion Test | | | | | |
|---|---|---|---|---|---|---|---|---|
| | Initial | Final | Load (g) | | Tensile strength (Kg/mm²) | | Fiber diameter (µ) | |
| Soln. | pH | pH | Blank | Treated | Blank | Treated | Blank | Treated |
| G1 | 0.81 | 0.80 | 18.31 | 29.33 | 59.16 | 96.47 | 19.73 | 19.71 |
| G2 | 0.83 | 0.80 | 17.80 | 22.26 | 58.87 | 80.12 | 19.64 | 19.38 |
| G3 | 0.90 | 0.75 | 18.30 | 26.29 | 50.27 | 73.75 | 21.49 | 21.40 |
| G4 | 0.93 | 0.86 | 15.04 | 20.67 | 55.40 | 75.59 | 18.67 | 18.66 |
| G5 | 0.92 | 0.89 | 24.62 | 26.83 | 66.78 | 74.42 | 21.74 | 21.44 |

Table VIb

| | After Corrosion Test | | | | | |
|---|---|---|---|---|---|---|
| | Load (g) | | Tensile strength (Kg/mm²) | | Fiber diameter (µ) | |
| Solution | Blank | Treated | Blank | Treated | Blank | Treated |
| G1 | 23.18 | 26.69 | 63.94 | 71.54 | 21.44 | 21.49 |
| G2 | 16.23 | 22.43 | 53.73 | 73.27 | 19.80 | 19.75 |
| G3 | 20.75 | 33.33 | 53.46 | 88.20 | 22.13 | 21.92 |
| G4 | 22.86 | 25.96 | 59.22 | 69.99 | 22.09 | 21.66 |
| G5 | 21.70 | 32.03 | 55.75 | 81.92 | 22.39 | 22.34 |

Table VIIa

| | | | Before Corrosion Test | | | | | |
|---|---|---|---|---|---|---|---|---|
| | Initial | Final | Load (g) | | Tensile strength (Kg/mm²) | | Fiber diameter (µ) | |
| Soln. | pH | pH | Blank | Treated | Blank | Treated | Blank | Treated |
| G1 | 0.81 | 0.80 | 25.00 | 28.41 | 78.21 | 84.09 | 20.02 | 20.48 |
| G2 | 0.83 | 0.84 | 26.60 | 31.70 | 83.32 | 108.92 | 20.12 | 19.89 |
| G3 | 0.90 | 0.87 | 20.97 | 27.51 | 73.07 | 97.50 | 18.57 | 19.00 |
| G4 | 0.93 | 0.72 | 20.48 | 30.04 | 76.17 | 111.59 | 18.57 | 18.43 |
| G5 | 0.95 | 0.81 | 25.24 | 27.53 | 90.46 | 101.57 | 18.82 | 18.61 |

Table VIIb

| | After Corrosion Test | | | | | |
|---|---|---|---|---|---|---|
| | Load (g) | | Tensile strength (Kg/mm²) | | Fiber diameter (µ) | |
| Solution | Blank | Treated | Blank | Treated | Blank | Treated |
| G1 | 27.33 | 27.73 | 82.73 | 86.28 | 20.46 | 20.23 |
| G2 | 25.06 | 30.91 | 85.94 | 100.35 | 19.35 | 19.78 |
| G3 | 17.34 | 25.13 | 68.37 | 98.23 | 17.99 | 18.17 |
| G4 | 20.31 | 30.51 | 72.62 | 110.18 | 18.76 | 18.74 |

Table VIIb-continued

| | After Corrosion Test | | | | | |
|---|---|---|---|---|---|---|
| | Load (g) | | Tensile strength (Kg/mm²) | | Fiber diameter (μ) | |
| Solution | Blank | Treated | Blank | Treated | Blank | Treated |
| G5 | 17.82 | 29.80 | 68.30 | 109.63 | 18.24 | 18.71 |

EXAMPLE VIII

Using a series of aqueous treating solutions H, glass fibers containing 7% by weight of zirconia were surface treated and subjected to the cement alkali corrosion test in the manner described with respect to Example II. The results, summarized in Table VIII, indicate that the hydrous titanium and zirconium oxide coatings deposited by the aqueous solutions H of this invention are effective to enhance the cement alkali corrosion resisting property of zirconia containing glass fibers treated therewith.

EXAMPLE IX

Using a series of aqueous treating solutions I, glass fibers containing 7% by weight of zirconia were surface treated and subjected to the cement alkali corrosion test in the manner described with respect of Example II. The results, summarized in Table IX, indicate that the hydrous titanium and hafnium oxide coatings deposited by the aqueous solutions I of this invention are effective to enhance the cement alkali corrosion resisting property of zirconia containing glass fibers treated therewith.

Table VIIIa

| | | | Before Corrosion Test | | | | | |
|---|---|---|---|---|---|---|---|---|
| Soln. | Initial pH | Final pH | Load (g) | | Tensile strength (Kg/mm²) | | Fiber diameter (μ) | |
| | | | Blank | Treated | Blank | Treated | Blank | Treated |
| H1 | 0.75 | 0.66 | 26.26 | 26.63 | 88.16 | 127.61 | 19.57 | 19.16 |
| H2 | 0.68 | 0.74 | 26.27 | 31.94 | 88.98 | 108.97 | 19.23 | 19.23 |
| H3 | 0.65 | 0.59 | 28.72 | 38.29 | 96.88 | 129.73 | 19.27 | 19.33 |
| H4 | 0.61 | 0.50 | 19.89 | 29.82 | 77.41 | 111.63 | 17.94 | 18.00 |
| H5 | 0.57 | 0.40 | 19.08 | 21.94 | 87.66 | 99.46 | 16.35 | 16.81 |

Table VIIIb

| | After Corrosion Test | | | | | |
|---|---|---|---|---|---|---|
| | Load (g) | | Tensile strength (Kg/mm²) | | Fiber diameter (μ) | |
| Solution | Blank | Treated | Blank | Treated | Blank | Treated |
| H1 | 25.57 | 33.12 | 88.20 | 117.91 | 19.14 | 18.94 |
| H2 | 24.47 | 31.30 | 83.10 | 106.96 | 19.32 | 19.27 |
| H3 | 24.46 | 25.65 | 92.62 | 99.75 | 18.11 | 18.12 |
| H4 | 24.31 | 27.78 | 104.05 | 115.59 | 17.27 | 17.34 |
| H5 | 26.52 | 28.31 | 96.31 | 103.98 | 18.88 | 18.72 |

Table IXa

| | | | Before Corrosion Test | | | | | |
|---|---|---|---|---|---|---|---|---|
| Soln. | Initial pH | Final pH | Load (g) | | Tensile strength (Kg/mm²) | | Fiber diameter (μ) | |
| | | | Blank | Treated | Blank | Treated | Blank | Treated |
| I1 | 0.75 | 0.77 | 19.06 | 33.71 | 73.01 | 120.75 | 18.56 | 18.83 |
| I2 | 0.68 | 0.49 | 23.44 | 30.32 | 86.51 | 109.68 | 18.50 | 18.79 |
| I3 | 0.65 | 0.46 | 22.48 | 27.94 | 83.86 | 105.67 | 18.54 | 18.34 |
| I4 | 0.61 | 0.45 | 20.32 | 22.75 | 73.86 | 86.81 | 18.77 | 18.36 |
| I5 | 0.57 | 0.43 | 20.49 | 30.49 | 71.69 | 100.53 | 19.11 | 19.59 |

Table IXb

| | After Corrosion Test | | | | | |
|---|---|---|---|---|---|---|
| | Load (g) | | Tensile strength (Kg/mm²) | | Fiber diameter (μ) | |
| Solution | Blank | Treated | Blank | Treated | Blank | Treated |
| I1 | 22.91 | 27.73 | 97.36 | 114.77 | 17.47 | 17.66 |
| I2 | 23.07 | 29.94 | 79.51 | 104.48 | 19.21 | 19.33 |
| I3 | 23.64 | 27.68 | 88.33 | 106.29 | 18.59 | 18.41 |
| I4 | 26.05 | 35.76 | 93.72 | 121.89 | 18.90 | 19.25 |
| I5 | 34.06 | 38.14 | 114.00 | 133.82 | 19.51 | 19.07 |

EXAMPLE X.

Using a series of aqueous treating solutions H, soda-lime glass fibers were surface treated and subjected to the cement alkali corrosion test in the manner described with respect to Example II. The results, summarized in Table X, indicate that the hydrous titanium and zirconium oxide coatings deposited by the aqueous solutions H of this invention are effective to enhance the cement alkali corrosion resisting property of soda-lime glass fibers treated therewith.

Table Xa

| | | | Before Corrosion Test | | | | | |
|---|---|---|---|---|---|---|---|---|
| | Initial | Final | Load (g) | | Tensile strength (kg/mm²) | | Fiber diameter (μ) | |
| Soln. | pH | pH | Blank | Treated | Blank | Treated | Blank | Treated |
| H1 | 0.73 | 0.69 | 22.12 | 24.59 | 65.55 | 74.06 | 20.80 | 20.50 |
| H2 | 0.71 | 0.79 | 20.72 | 21.19 | 62.73 | 62.60 | 20.66 | 20.76 |
| H3 | 0.68 | 0.51 | 24.75 | 29.03 | 62.77 | 74.61 | 22.45 | 22.22 |
| H4 | 0.60 | 0.40 | 20.34 | 24.36 | 62.66 | 75.16 | 20.42 | 20.26 |
| H5 | 0.50 | 0.45 | 30.74 | 36.84 | 78.88 | 92.90 | 22.24 | 22.52 |

Table Xb

| | After Corrosion Test | | | | | |
|---|---|---|---|---|---|---|
| | Load (g) | | Tensile strength (Kg/mm²) | | Fiber diameter (μ) | |
| Solution | Blank | Treated | Blank | Treated | Blank | Treated |
| H1 | 22.74 | 25.91 | 64.45 | 70.66 | 21.36 | 21.38 |
| H2 | 19.69 | 20.72 | 64.71 | 66.80 | 19.35 | 19.70 |
| H3 | 22.62 | 24.66 | 68.08 | 75.52 | 20.59 | 20.38 |
| H4 | 21.02 | 24.81 | 56.21 | 68.53 | 21.71 | 21.60 |
| H5 | 16.95 | 24.83 | 61.34 | 85.39 | 18.76 | 19.22 |

EXAMPLE XI

Using a series of aqueous treating solutions I, soda-lime glass fibers were surface treated and subjected to the cement alkali corrosion test in the manner described with respect to Example II. The results, summarized in Table XI, indicate that the hydrous titanium and hafnium oxide coatings deposited by the aqueous treating solutions H of this invention are effective to enhance the cement alkali corrosion resisting property of soda-lime glass fibers treated therewith.

Table XIa

| | | | Before Corrosion Test | | | | | |
|---|---|---|---|---|---|---|---|---|
| | Initial | Final | Load (g) | | Tensile strength (Kg/mm²) | | Fiber diameter (μ) | |
| Soln. | pH | pH | Blank | Treated | Blank | Treated | Blank | Treated |
| I1 | 0.77 | 0.77 | 28.69 | 34.23 | 74.53 | 86.85 | 22.18 | 22.37 |
| I2 | 0.68 | 0.49 | 23.34 | 25.83 | 60.62 | 66.82 | 22.18 | 21.89 |
| I3 | 0.61 | 0.46 | 19.30 | 20.44 | 55.73 | 59.13 | 20.82 | 20.99 |
| I4 | 0.60 | 0.45 | 16.24 | 21.02 | 50.95 | 71.02 | 19.93 | 19.55 |
| I5 | 0.57 | 0.43 | 27.82 | 36.50 | 70.93 | 95.14 | 22.45 | 22.21 |

Table XIb

| | After Corrosion Test | | | | | |
|---|---|---|---|---|---|---|
| | Load (g) | | Tensile strength (Kg/mm²) | | Fiber diameter (μ) | |
| Solution | Blank | Treated | Blank | Treated | Blank | Treated |
| I1 | 24.73 | 27.34 | 60.99 | 68.05 | 22.66 | 22.61 |
| I2 | 18.39 | 23.18 | 60.00 | 73.79 | 19.81 | 20.03 |
| I3 | 21.58 | 25.27 | 65.54 | 77.57 | 20.42 | 20.50 |
| I4 | 24.85 | 28.78 | 64.14 | 78.95 | 22.03 | 21.69 |
| I5 | 18.33 | 30.59 | 50.56 | 85.42 | 21.40 | 21.30 |

EXAMPLE XII

Using a series of aqueous treating solutions J, soda-lime glass fibers were surface treated and subjected to the cement alkali corrosion test in the manner described with respect to Example II. The results, summarized in Table XII, indicate that the phosphate coatings deposited by the aqueous treating solutions J of this invention are effective to enhance the cement alkali corrosion resisting property of soda-lime glass fibers treated therewith.

Table XIIa

| | | | Before Corrosion Test | | | | | |
| | Initial | Final | Load (g) | | Tensile strength (Kg/mm²) | | Fiber diameter (μ) | |
| Soln. | pH | pH | Blank | Treated | Blank | Treated | Blank | Treated |
| --- | --- | --- | --- | --- | --- | --- | --- | --- |
| J1 | 2.31 | 2.31 | 19.84 | 22.20 | 64.35 | 83.65 | 19.88 | 19.73 |
| J2 | 1.79 | 1.78 | 24.58 | 29.56 | 56.99 | 70.65 | 23.35 | 23.44 |
| J3 | 1.62 | 1.58 | 27.32 | 28.08 | 74.13 | 74.98 | 21.69 | 21.96 |
| J4 | 1.41 | 1.30 | 23.74 | 26.44 | 57.16 | 62.74 | 23.20 | 23.18 |
| J5 | 1.29 | 1.19 | 20.79 | 22.32 | 66.00 | 69.34 | 20.12 | 20.52 |

Table XIIb

| | After Corrosion Test | | | | | |
| | Load (g) | | Tensile strength (Kg/mm²) | | Fiber diameter (μ) | |
| Solution | Blank | Treated | Blank | Treated | Blank | Treated |
| --- | --- | --- | --- | --- | --- | --- |
| J1 | 20.35 | 26.18 | 55.00 | 70.63 | 21.66 | 21.57 |
| J2 | 19.54 | 27.30 | 51.01 | 71.79 | 21.89 | 21.82 |
| J3 | 25.53 | 34.10 | 60.35 | 80.89 | 23.07 | 23.23 |
| J4 | 23.64 | 27.31 | 53.06 | 64.64 | 23.80 | 23.27 |
| J5 | 27.17 | 30.03 | 69.54 | 78.91 | 21.31 | 21.91 |

EXAMPLE XIII

Using a series of aqueous treating solutions J, glass fibers containing 7% by weight of zirconia were surface treated and subjected to the cement alkali corrosion test in the manner described with respect to Example II. The results, summarized in Table XIII, indicate that the phosphate coatings deposited by the aqueous solutions J of this invention are effective to enhance the cement alkali corrosion resisting property of zirconia containing glass fibers treated therewith.

Table XIIIa

| | | | Before Corrosion Test | | | | | |
| | Initial | Final | Load (g) | | Tensile strength (Kg/mm²) | | Fiber diameter (μ) | |
| Soln. | pH | pH | Blank | Treated | Blank | Treated | Blank | Treated |
| --- | --- | --- | --- | --- | --- | --- | --- | --- |
| J3 | 1.62 | 1.58 | 22.29 | 26.10 | 81.36 | 94.57 | 18.61 | 18.67 |
| J4 | 1.41 | 1.32 | 23.21 | 24.05 | 93.71 | 95.60 | 17.78 | 17.86 |
| J5 | 1.29 | 1.20 | 21.76 | 25.05 | 85.51 | 97.41 | 17.89 | 18.18 |
| J6 | 0.99 | 0.99 | 23.29 | 41.66 | 72.85 | 129.98 | 20.24 | 20.24 |
| J7 | 0.89 | 0.89 | 24.72 | 29.08 | 83.25 | 98.55 | 19.42 | 19.37 |

Table XIIIb

| | After Corrosion Test | | | | | |
| | Load (g) | | Tensile strength (Kg/mm²) | | Fiber diameter (μ) | |
| Solution | Blank | Treated | Blank | Treated | Blank | Treated |
| --- | --- | --- | --- | --- | --- | --- |
| J3 | 22.21 | 25.80 | 90.14 | 102.66 | 17.74 | 17.94 |
| J4 | 20.17 | 25.56 | 81.53 | 98.07 | 17.80 | 18.04 |
| J5 | 16.87 | 27.47 | 67.11 | 113.80 | 18.07 | 17.64 |
| J6 | 19.29 | 28.96 | 63.33 | 97.27 | 19.65 | 19.52 |
| J7 | 26.09 | 27.04 | 84.60 | 84.30 | 19.89 | 20.27 |

What is claimed is:

1. In a method for reinforcing aqueous hydraulic cement wherein glass fibers are incorporated into the cement, the improvement which comprises said fibers containing zirconia and immersing the fibers in an aqueous solution of a compound selected from the group consisting of phosphoric acids, zirconium salts, titanium salts, and hafnium salts at a temperature from 80° to 95° C prior to incorporating the fibers in the cement for a time sufficient to improve the alkali resistance thereof.

2. Hardened cement reinforced by the method of claim 1.

3. In a method for reinforcing aqueous hydraulic cement wherein glass fibers are incorporated into the cement, the improvement which comprises said fibers containing zirconia and immersing said glass fibers in an aqueous solution of a zirconium salt at a temperature from 80° to 95° C prior to incorporating the fibers in the cement for a time sufficient to improve tha alkali resistance thereof.

4. In a method for reinforcing aqueous hydraulic cement wherein glass fibers are incorporated into the cement, the improvement which comprises said fibers containing zirconia and immersing said glass fibers in an aqueous solution of a titanium salt at a temperature from 80° to 95° C prior to incorporating the fibers in the cement for a time sufficient to improve the alkali resistance thereof.

5. In a method for reinforcing aqueous hydraulic cement wherein glass fibers are incorporated into the cement, the improvement which comprises said fibers containing zirconia and immersing said glas fibers in an aqueous solution of a hafnium salt at a temperature from 80° to 95° C prior to incorporating the fibers in the cement for a time sufficient to improve the alkali resistance thereof.

6. In a method for reinforcing aqueous hydraulic cement wherein glass fibers are incorporated into the cement, the improvement which comprises said fibers containing zirconia and immersing said glass fibers in an aqueous mixed solution of zirconium salt and hafnium salt at a temperature from 80° to 95° C prior to incorporating the fibers in the cement for a time sufficient to improve the alkali resistance thereof.

7. In a method for reinforcing aqueous hydraulic cement wherein glass fibers are incorporated into the cement, the improvement which comprises said fibers containing zirconia and immersing said glass fibers in an aqueous mixed solution of titanium salt and zirconium salt at a temperature from 80° to 95° C prior to incorporating the fibers in the cement for a time sufficient to improve the alkali resistance thereof.

8. In a method for reinforcing aqueous hydraulic cement wherein glass fibers are incorporated into the the cement, the improvement which comprises said fibers containing zirconia and immersing said glass fibers in an aqueous mixed solution of titanium salt and hafnium salt at a temperature from 80° to 95° C prior to incorporating the fibers in the cement for a time sufficient to improve the alkali resistance thereof.

9. In a method for reinforcing aqueous hydraulic cement wherein glass fibers are incorporated into the cement, the improvement which comprises said fibers containing zirconia and immersing said glass fibers in an aqueous solution of phosphoric acid at a temperature from 80° to 95° C prior to incorporating the fibers in the cement for a time sufficient to improve the alkali resistance thereof.

* * * * *